Patented Nov. 7, 1933

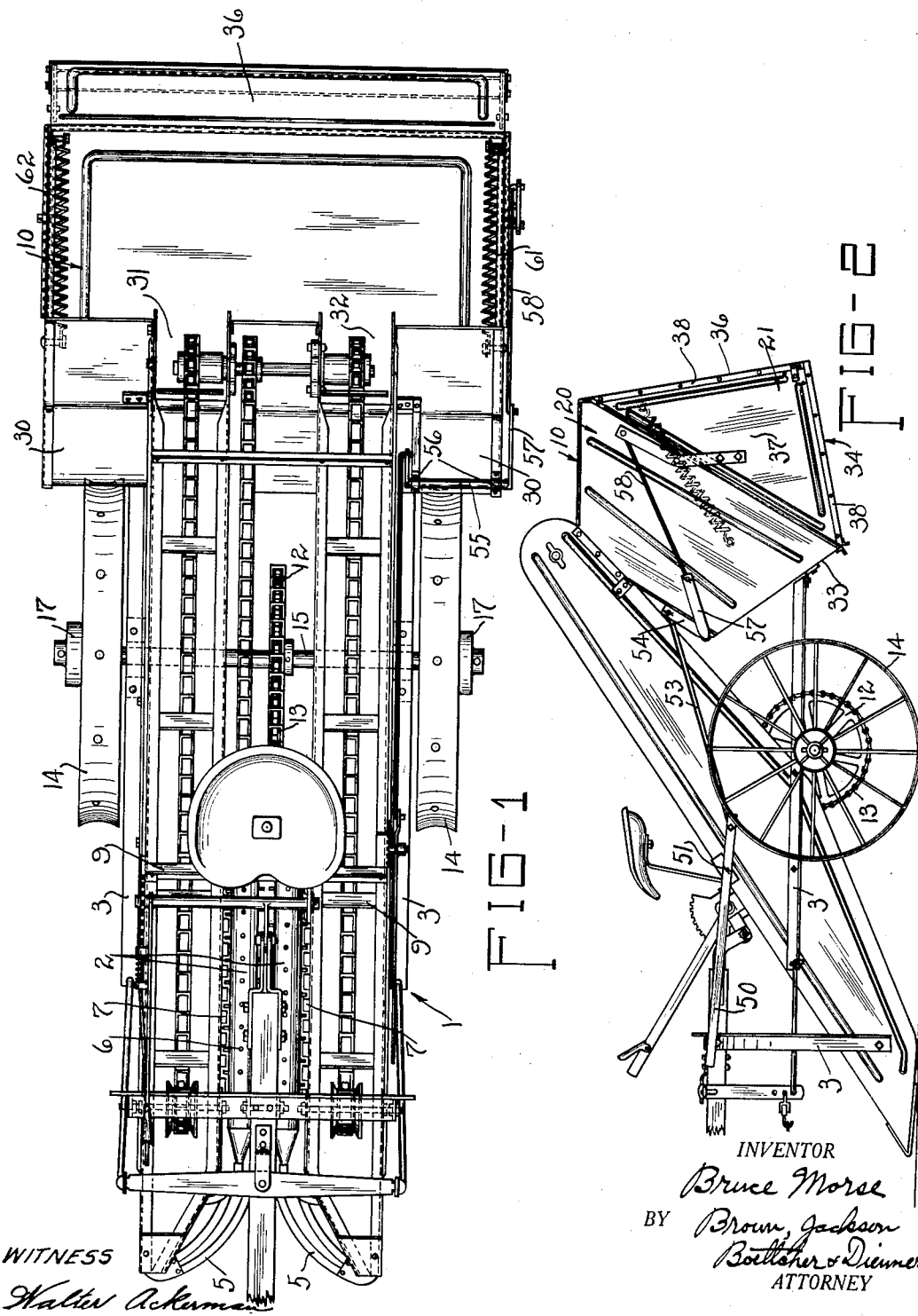

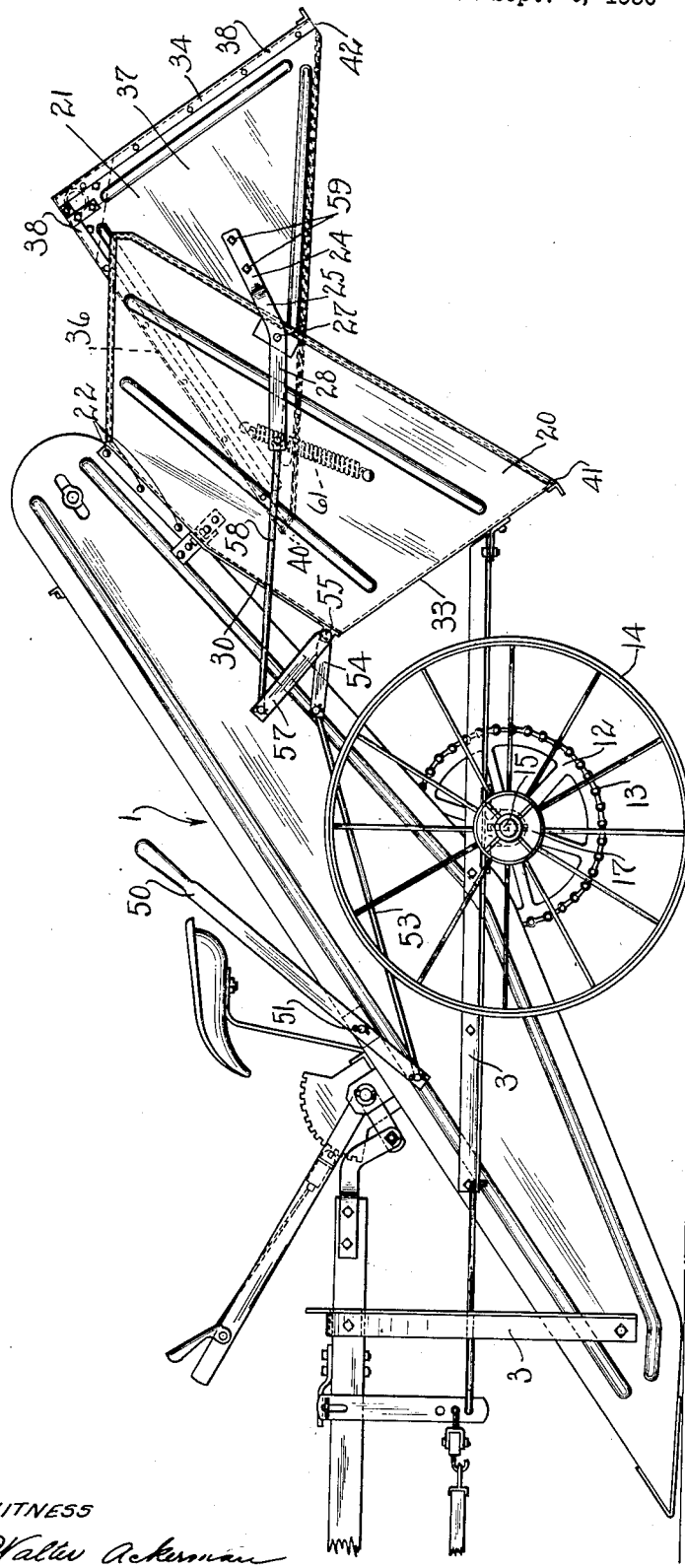

1,933,922

UNITED STATES PATENT OFFICE 1,933,922

HARVESTER

Bruce Morse, Crosbyton, Tex., assignor to Deere & Company, Moline, Ill., a corporation of Illinois Application September 5, 1930. Serial No. 479,876

37 Claims. (Cl. 56—33)

The present invention relates generally to agricultural implements, particularly those of the type commonly known as harvesters.

More specifically, the present invention has for its principal object the provision of a new and improved receiving hopper for horse drawn cotton strippers. Machines of this type are commonly employed in the cotton country and usually include some form of means, such as rotating rolls, for removing the cotton from the stalks as the machine passes along the row. Horse drawn cotton strippers are also usually provided with some form of hopper for collecting the cotton as it is removed from the cotton plants by the stripping mechanism. Heretofore it has been found that in the travel of the machine over the field, the cotton collected in the hopper becomes more or less packed into one solid mass, in which case it becomes rather difficult to readily remove the cotton mass from the hopper unless the latter is particularly devised to achieve easy removal.

The principal object of the present invention is, therefore, the provision of an improved hopper for cotton strippers wherein the discharge of cotton from the hopper is easily effected and with no danger of any cotton remaining in the hopper after dumping the same.

Another object of the present invention is the provision of improved means for effecting dumping of the hopper or receptacle, which means is, in the type of cotton stripper illustrated, manually operated.

Other objects and advantages of the present invention will be apparent to those skilled in the art after a consideration of the following detailed description of the preferred embodiment, which is illustrated in the accompanying drawings, in which:

Figure 1 is a top plan view of a single row cotton stripper provided with a receiving hopper constructed in accordance with the present invention;

Figure 2 is a vertical side elevation, on a reduced scale, of the machine illustrated in Figure 1; and Figure 3 is an enlarged vertical elevation at substantially the same scale as Figure 1 and showing the machine illustrated in Figure 1 with the receiving hopper open or in discharge position.

Referring now to the drawings, the reference numeral 1 indicates the cotton stripper in its entirety having stripper rolls 2 journaled in and forming frame 3, preferably in a downwardly and forwardly inclined position. The forward part of the frame 3 is formed to provide side arms 5 which serve to guide the stalks of cotton in between the rolls 2, as is well understood in the art.

Each of the rolls 2 is provided with a plurality of teeth 6 which operate adjacent projections 7 on the frame 3, the projections serving to remove cotton from the teeth 6. The rolls 2 rotate upwardly on adjacent sides, and after the cotton is removed from the rolls 2 by the projections 7 it is received by one or the other of the conveyors 9, the lower run of these conveyors serving to carry the cotton upwardly and rearwardly and to deposit the same into a hopper 10. The rolls 2 and the conveyors 9 are driven in the usual manner from a drive sprocket 12 and drive chain 13, the drive sprocket 12 being driven from the ground wheels 14 in the usual manner, as by a drive shaft 15 and ratchet connections 17 between the shaft 15 and the ground wheels 14.

The hopper 10 of the present invention comprises two sections 20 and 21, the section 20 being rigidly fixed to the sides of the stripper proper by means of rivets 22. The section or hopper part 21 is pivotally mounted on the section 20 by means of a bracket 24 secured to either side of the pivoted section 21 and provided with an offset portion 25 each having an aperture to receive the pivot studs 27 securely fixed to the stationary hopper part 20. One of the brackets 24 is provided with an extension or lever portion 28 to be described more fully later.

The front side 30 of the section 20 is inclined forwardly underneath the harvester for the purpose of increasing the capacity of the hopper. This front side 30 is notched out, as at 31 and 32, at points where the cotton is delivered into the hopper 10 by the conveyors 9. The section 30 has a sloping bottom 33, the slope or inclination thereof being sufficiently great that the cotton will have no tendency to cling to the hopper when the latter is opened to dumping position. It will also be noted that the bottom 34 of the pivoted hopper section 21 is also sloping and is inclined slightly upward and rearward. In this way the rearmost part of the hopper 10 is prevented from being injured by coming into contact with the ground in the event that the front end of the harvester is tipped upwardly. Also, the provision of the downwardly converging bottom walls 33 and 34 aids in discharging the cotton. The rear wall 36 of the pivoted section 21 is substantially at right angles to the bottom wall 34, and triangular shaped wall 37 joins the aforementioned bottom and rear walls. Reinforcing angles 38 may be employed to strengthen the corners of either or both of these hopper sections.

The upper end of the section 21 moves about the pivot 27, the latter being so positioned that the tip 40 will just pass the end of the harvester in opening the hopper to dumping position. The rear side 36 of the hopper, when the hopper is moving into dumping position, travels up over the mass of cotton in the hopper and, as shown in dotted lines in Figure 3, swings up on top of the cotton and forces it out of the lower end. The pivot 27 being spaced a considerable distance from the lower edge 41 of section 20 causes the lower edge 42 of the section 21 to be swung a considerable distance away when the hopper is opened to dumping position. Also, as seen in Figure 3, the bottom 34 of section 21 is swung to a position in substantial parallelism with the inclined bottom 33 of section 20. This prevents all bridging tendency of the cotton in the hopper and as a result the cotton never fails to discharge from the hopper.

The opening of the hopper is controlled by a manually operated lever and link mechanism comprising a lever 50 pivoted to the harvester at 51. The lower end of lever 21 is connected by means of a rod 53 to an arm 54 on a rock shaft 55 journaled as at 56 on the hopper section 20. On its outer end the rock shaft 55 is provided with an arm 57 which is connected by means of a rod 58 to the lever 28. As best seen in Figure 3, the lever 28 and bracket 24 are bolted to the side of section 21 by means of bolts 59 and are provided with perforations which embrace pivot 27, as stated above.

For the purpose of facilitating the opening of the hopper 10 a pair of springs 61 and 62 are provided, one end of each spring being connected to the stationary hopper section 20 while the other end of each of the springs is connected to the tiltable section 21, as will be clear by referring to Figure 3. These springs 61 and 62 are preferably positioned inside of the hopper and on opposite sides thereof, but it is to be understood, of course, that the springs 61 and 62 may be outside if desired. The points of connection of the springs 61 and 62 are such that when the hopper is in closed position, as shown in Figure 2, the springs pass substantially over or slightly below the pivots 27. Since the line of force acting between the two connecting points of each of the springs 61 and 62 lies just below the pivot axis defined by the pivots 27 the tendency of the springs 61 and 62 is to hold or lock the hopper sections 20 and 21 in closed position. When, however, the hopper has been opened to discharge the cotton therein the springs 61 and 62 move across the pivot axis 27 and to a point substantially distant therefrom, as shown in Figure 3, so that now the springs exert a substantial force to aid the upward swinging of the tiltable hopper section 21. If desired, the springs 61 and 62 may be so constructed and arranged that they substantially balance or exceed the turning couple due to the weight of the hopper section 21.

The lever system, described above, for opening the hopper has been so designed that, during the first part of the opening operation when the springs 61 and 62 are least effective in aiding the opening of the hopper, the lever 50 operates under conditions producing the greatest mechanical advantage. By referring to Figure 2 it will be noted that the link 53 is almost in line with the lever 50, and also it will be noted that the link 58 is almost in line with the arm 57. It will thus be observed that lever 50 must be moved through a considerable angle before the link 53 is displaced any appreciable amount, and furthermore the arms 54 and 57 and the lock shaft 55 must be turned to a substantial angle before the link 58 will swing the hopper section 21 any appreciable amount away from the stationary hopper section 20. It will be understood, of course, that as the lever 50 swings upwardly and the arms 54 and 57 swing in a counterclockwise direction this mechanical advantage just referred to becomes smaller, but at this time the effect of the springs 61 and 62 becomes greater. This is an important feature of the present invention, in that such a construction makes for an easily operated hopper.

The relation between the arm 57 and the link 58 may be so arranged that they can operate as a toggle to securely lock the hopper section 21 in closed position. This position is shown in Figure 2 where it will be noted any tendency for the section 21 to open will tend to cause the arms 54 and 57 to rotate in a clockwise direction, link 58 at this time being under compression, but this clockwise rotation of the arms 54 and 57 is effectively resisted due to the aligned relation between the lever 50 and the link 53. As has already been pointed out above, the springs 61 and 62 also tend to hold the hopper section 21 in closed position.

The operation of the herein described device is believed to be obvious from the above description. As the impliment passes down the row the rotating rolls 2 remove the cotton from the stalks and the cotton is directed toward the conveyors 9 which, in turn, carry the cotton upwardly and rearwardly on either side of the machine, and at the upper end of the conveyors the cotton is dropped into the hopper 10. When the latter is filled or, if desired, when the machine is at the end of a row, it is desirable to deposit the cotton on the ground. To effect this operation, the operator grasps the lever 50, swinging upwardly upon the same. This occasions an opening of the hopper sections 20 and 21, the opening being effected at first gradually as just pointed out above. After the hopper sections are separated a small amount the opening is hastened by virtue of the mechanical arrangement of the levers and links constituting the lever system for opening the hopper. Toward the end of the opening movement the upper part of the tiltable upper section 21 is forcibly brought down against any cotton remaining in the hopper. In this manner the cotton is positively expelled from the hopper.

As has been described, however, it seldom occurs that any cotton remains in the hopper after the separation of the hopper sections has progressed to any substantial amount. This is due to the fact that the width of opening of the separated sections is greater than the width of the hopper when the sections are closed and the hopper is in cotton receiving position.

While I have described in connection with the accompanying drawings the preferred embodiment of my invention, it is to be understood, of course, that my invention is not to be limited to the specific means shown and described but that, in fact, widely different means may be employed in a practice of the broader aspects of my invention. For example, I have shown a single row horse drawn cotton stripper, but it is obvious that my invention could be employed in connection with tractor drawn or tractor propelled cotton strippers wherever such construction may be be found desirable.

What I claim, therefore, and desire to secure by Letters Patent is:

1. In a cotton stripper, means for receiving the cotton from said stripper comprising a container having a bottom including separable parts, one of said parts including a portion movable toward the bottom of the container to forcibly eject the contents therefrom, and means to separate said parts to discharge the contents of said container.

2. In a cotton stripper, means for receiving the cotton from said stripper comprising a container having a bottom including separable parts, means to separate said parts to discharge the contents of said container, and resilient means adapted to aid said separating means.

3. In a cotton stripper having a frame means for receiving the cotton from the stripper comprising a two-part hopper structure, one part being secured to said frame and the other part being pivoted with respect thereto, resilient means adapted to aid the separation of said hopper parts and acting most effectively after said hopper parts are separated a substantial amount, and manually operated means for initiating the separating movement.

4. In a cotton stripper having a frame, means for receiving the cotton from the stripper comprising a two-part hopper structure, one part being secured to said frame and the other part being pivoted with respect thereto, a spring connected at one end to the stationary hopper part and at the other end to the pivoted hopper part, the effective lever arm of the spring being greater when the parts are separated and in cotton dumping position than when they are in cotton receiving position, and manually operable means for separating said parts to dispose of the cotton.

5. In a cotton stripper having a frame, means for receiving the cotton from the stripper comprising a two-part hopper structure, one part being secured to said frame and having a downwardly and rearwardly extending opening and a rearwardly sloping bottom wall, the other part being pivoted to the stationary part to swing about a transverse pivotal axis substantially midway thereof to close said opening and comprising a bottom wall, a rear wall, and side walls joining the former, and means for swinging said pivoted part toward and away from the stationary part for disposing of the contents of said container.

6. In a cotton stripper having a wheeled frame, means for receiving the cotton from the stripper comprising a two-part hopper structure, one part being secured to said frame and having downwardly and rearwardly sloping bottom and a discharge opening having upwardly and rearwardly extending sides, the other part being pivoted to the stationary part to swing about a transverse pivotal axis substantially midway thereof to close said opening and comprising a bottom wall, a rear wall, and side walls joining the former, the bottom wall sloping upwardly and rearwardly when the pivoted part is closed extending parallel to the sloping bottom of the stationary part when the pivoted part is swung away from the stationary part to discharge the cotton in the hopper, spring means connected to the hopper parts and adapted, when the parts are separated, to extend to one side of their pivotal axis and to extend on the other side of said pivotal axis when the parts are closed, whereby said spring means is adapted to maintain said parts either in open or closed position, and manually operable means to swing the pivoted hopper part toward and away from the stationary hopper part.

7. In a cotton stripper having a wheeled frame, means for receiving the cotton from the stripper comprising a two-part hopper structure, one part being secured to said frame and having downwardly and rearwardly sloping bottom and a discharge opening having upwardly and rearwardly extending sides, the other part being pivoted to the stationary part to swing about a transverse pivotal axis substantially midway thereof to close said opening and comprising a bottom wall, a rear wall, and side walls joining the former, the bottom wall sloping upwardly and rearwardly when the pivoted part is closed extending parallel to the sloping bottom of the stationary part when the pivoted part is swung away from the stationary part to discharge the cotton in the hopper, spring means connected to the hopper parts and adapted, when the parts are separated, to extend to one side of their pivotal axis and to extend on the other side of said pivotal axis when the parts are closed, whereby said spring means is adapted to maintain said parts either in open or closed position, and manually operable means to swing the pivoted hopper part toward and away from the stationary hopper part, said last mentioned means including a plurality of pivoted and connecting links so constructed and arranged that at the beginning of the hopper opening operation certain of the connecting links are substantially in line whereby a given angular movement of the pivoted link occasions a relatively small displacement of the connecting link associated therewith.

8. A dumping receptacle for an agricultural implement having crop gathering means, said dumping receptacle comprising a stationary hopper having a discharge mouth and a pivoted closure for the same, a spring connected to the hopper and the closure and operative to effect separation thereof, the effectivness of said spring increasing approximately as the sine of the angle of separation, and manually operated means for swinging the pivoted closure to and from discharge position, said last mentioned means being most effective at the beginning of the opening movement when the effect of the spring is relatively the least.

9. A dumping receptacle for a cotton stripper comprising a two part hopper and means to prevent bridging of the cotton therein when the hopper is dumped.

10. A dumping receptacle for a cotton stripper comprising a two-part hopper and means to forcibly expel the cotton therefrom when the hopper is dumped.

11. In a cotton stripper, receiving means to receive the cotton, comprising a hopper having a stationary and a movable part, means for separating said parts to dump the cotton, said means being capable of exerting a greater force at the beginning of the dumping movement, and means to aid said separating means, said aiding means being capable of exerting a greater force after the initiation of the dumping movement.

12. In a cotton stripper, receiving means to receive the cotton comprising a hopper having a stationary and a movable part, a pair of brackets secured to the movable part and pivotally connected with the stationary part, and means for separating said parts to dump the cotton, said means being capable of exerting a greater force at the beginning of the dumping movement and including link and lever mechanism connected to one of said brackets.

13. In a cotton stripper of the class described comprising a conveyor adapted to receive cotton and move the same rearwardly, said conveyor extending upwardly and rearwardly, a cotton receiving receptacle secured to said frame under the rearward portion of said conveyor and an upwardly swinging closure having a part adapted to move under the conveyor and eject the cotton in the receptacle.

14. In a cotton stripper, receiving means for the cotton comprising a dumping receptacle having parts movable to open and closed position, and a combined spring and lever mechanism for controlling the relative position of said parts.

15. In an agricultural implement, a discharge hopper including a relatively stationary part and a relatively movable part disposed in downwardly converging relation when the hopper is closed and forming the bottom thereof, one of said parts being movable away from the other to discharge the contents of said hopper, the walls of said parts being arranged in parallel spaced apart relation when the parts are separated to provide for the free discharge of said contents.

16. In an agricultural implement having a supporting frame and conveyor mechanism, a receiving hopper supported from the frame and a portion of said conveyor mechanism, said hopper including a tiltable section having a bottom wall meeting the bottom wall of the hopper at a downwardly converging angle, means pivoting said section to the hopper at a point above the center thereof so that as the section is swung outwardly the discharge opening is greater than a cross section through the hopper when it is closed, and manually operated means to swing said tiltable section.

17. In an agricultural implement, a receiving hopper comprising a tiltable section having a bottom wall meeting the bottom wall of the hopper and a downwardly converging angle, said tiltable section having a rear wall, means pivoting said section to the hopper at a point above the center thereof so that as the section is swung outwardly the discharge opening is greater than a cross section through the hopper when closed and the upper part of the rear wall pivots downwardly in the hopper and forcibly ejects material therefrom, and manually operated means to swing said tiltable section.

18. In a cotton harvester having a frame and an operator's seat on said frame, a hopper spaced rearwardly of said operator's seat for receiving the cotton, said hopper including a part movable to opened and closed position, a lever mounted on the frame adjacent the operator's seat, and connections from said lever to said hopper part whereby the latter may be moved to opened and closed position through manipulation of said lever.

19. In an agricultural machine, a wheeled supporting frame, an operator's seat on said frame, row following means positioned forward of the operator's seat for removing material from plants, conveyor mechanism for moving the material from said last mentioned means to a point in rear of said operator's seat, and a hopper to receive the material at said point, the hopper being supported from the frame and a portion of said conveyor mechanism, said hopper including a tiltable section having a bottom wall meeting the bottom wall of the hopper, means pivoting said section to the hopper at a point above the center thereof so that as the section is swung outwardly the discharge opening is greater than a cross section through the hopper when it is closed, and manually operated means accessible from the operator's seat to swing said tiltable section.

20. A hopper comprising, in combination, a container for receiving material, said container including a stationary receptacle having a discharge mouth and a pivoted closure for the same, a spring connected to the receptacle and the closure and operative to effect separation thereof, the effectiveness of said spring increasing approximately as the sine of the angle of separation, and manually operated means for swinging the pivoted closure to and from discharge position, said last mentioned means being most effective at the beginning of the opening movement when the effect of the spring is relatively the least.

21. A hopper comprising a pair of complementary receptacle parts, means pivotally connecting said parts together for relative movement about an axis above the center of gravity of said parts, whereby said parts normally tend to occupy a closed position, means for moving said parts to open position, and spring means biased to aid said last mentioned means in opening said parts.

22. A hopper comprising a pair of complementary receptacle parts, means pivotally connecting said parts together whereby they are relatively movable to open position with the oposite walls thereof substantially parallel, and means movable with said parts as they are opened and acting to eject the material from the hopper.

23. A hopper comprising a pair of complementary receptacle parts, one of said parts being stationary and the other part being movable, means pivoting the movable part on the stationary part for movement about a pivotal axis, means to open and close the hopper, and a spring having one end connected with the stationary part and the other end connected with the movable part and biased to aid in opening the hopper, said spring being so arranged that when the hopper parts are closed the spring intersects the pivotal axis.

24. A hopper comprising a pair of complementary hopper parts, means pivoting the parts together to swing about a pivotal axis, a spring having its ends connected respectively with said hopper parts and arranged to be tensioned when said parts are closed and to lie along a line intersecting said pivotal axis, whereby said spring is ineffective to aid in opening said parts as long as the latter are fully closed, and means for moving said hopper parts to open position including a toggle connection adapted to releasably maintain the hopper parts in closed position.

25. A hopper comprising a pair of complementary receptacle parts, means pivoting one of said parts on the other for movement about a pivotal axis relatively thereto, and means for opening and closing said parts including a link pivotally connected with said one part at a point spaced from said pivotal axis, and a swinging lever journaled on the other of said receptacle parts and including an arm connected with said link and arranged to form therewith a toggle to releasably maintain the receptacle parts in closed position.

26. A hopper comprising a pair of complementary hopper parts, each of said parts including a bottom and a side and a pair of generally triangular end walls, said hopper parts being pivoted together so as to swing to open and closed position, and means pivotally connecting the parts together so that as the parts open a portion of one of the parts enters the other part to eject the material therefrom.

27. A hopper comprising a pair of complementary hopper parts, each part including a bottom wall and a side wall and generally triangular end walls joined to the bottom and side walls, means pivotally connecting the hopper parts together for movement about a transverse axis intermediate the ends of the edges of the end walls, each of which forms the hypotenuse of each of the triangular end walls, said edges being arranged to substantially meet when the parts are in closed position, and means for swinging said parts to open and closed position, one of the parts including a portion above the pivotal axis which is adapted to enter the other part when the hopper is opened to forcibly eject the material therefrom.

28. A hopper for an agricultural machine having a supporting frame and conveyor mechanism thereon, said hopper comprising a front wall notched out to accommodate said conveyor mechanism and to receive material therefrom, side walls and a downwardly inclined bottom wall connected with the front wall, and a complementary section pivotally supported by certain of said walls and cooperating with said downwardly inclined bottom wall when the hopper is closed to prevent the discharge of material from the hopper.

29. A hopper for a cotton harvester having cotton conveyor mechanism, said hopper comprising a front wall provided with openings to receive said conveyor mechanism, side walls connected with the front wall and said conveyor mechanism, a downwardly sloping bottom connected with said walls, and a complementary hopper section serving to close said side and bottom walls and movable away from the downwardly sloping bottom to provide for the discharge of material from the hopper.

30. In a cotton stripper, means for receiving the cotton from said stripper comprising a container including separable parts, one of said parts including a portion acting as one side of the container and operable when the parts are separated to move in over the top of the container to forcibly eject the contents therefrom, and means to separate said parts to discharge the contents of said container.

31. In a cotton stripper having a wheeled frame, means for receiving the cotton comprising a two-part hopper structure, one part being secured to said frame and the other part being pivoted with respect thereto, the pivoted part comprising a side and the bottom, said parts being pivotally connected so that when the bottom of the pivoted part is swung away from the other part the side of the pivoted part is swung over the top of the container with a downward motion to forcibly eject the contents from the hopper, and means for swinging said pivoted part toward and away from the stationary part for disposing of the contents of said container.

32. In an agricultural implement, a discharge hopper including a relatively stationary part and a relatively movable part, one of said parts being movable away from the other to discharge the contents of said hopper, the adjacent walls of said parts being arranged in converging relation when the parts are together and in parallel spaced apart relation when the parts are separated.

33. In an agricultural implement, a hopper including a relatively stationary part and a relatively movable part, means movably connecting said parts together so that as the movable part is shifted away from the stationary part the area of the discharge opening of the hopper is greater than a cross section through the hopper when it is closed.

34. In an agricultural implement, a two-part container, one part being movable away from the other part to provide an opening for discharging the contents therefrom, said parts being so related that the width of the opening when the parts are separated is greater than the width of the container when the parts are together.

35. In an agricultural implement, a hopper including a relatively stationary part and a relatively movable part, and means pivoting said parts together at a point spaced from the center thereof so that, as the parts are separated to form a discharge opening for discharging the material from the hopper, the size of the opening is greater than the size of the hopper when closed, whereby bridging of the material in the hopper is prevented.

36. A hopper comprising a pair of complementary hopper parts, means pivotally connecting the hopper parts together for movement about a transverse axis spaced from the center thereof, and means for swinging said parts to open and closed positions, the open position defining an opening having a greater area than the cross sectional area of the hopper when said parts are closed.

37. A hopper comprising a pair of complementary parts, each part including generally triangular end walls, means pivotally connecting the hopper parts together for movement about a transverse axis adjacent the upper portion of said parts, and means for swinging said parts to open and closed position, the open position defining a discharge opening having a greater area than the cross sectional area of said hopper when the parts are closed.

BRUCE MORSE.